United States Patent [19]

Yin

[11] Patent Number: 4,607,194
[45] Date of Patent: Aug. 19, 1986

[54] GAP AND STRIPLINE COMBINED MONITOR

[75] Inventor: Yan Yin, Palo Alto, Calif.

[73] Assignee: The United States of America as represented by the United States Department of Energy, Washington, D.C.

[21] Appl. No.: 580,981

[22] Filed: Feb. 16, 1984

[51] Int. Cl.[4] .......................... H01J 7/46; H01J 19/80
[52] U.S. Cl. .................................... 315/39; 324/71.4; 324/71.3; 328/228; 333/204
[58] Field of Search .................... 324/71.3, 71.4, 71.2, 324/71.1; 328/228, 230, 235, 227; 313/425; 250/397; 333/296, 204; 315/39

[56] References Cited

U.S. PATENT DOCUMENTS

| | | | |
|---|---|---|---|
| 3,412,337 | 11/1968 | Lothrop | 328/228 |
| 3,576,438 | 4/1971 | Pease | 250/397 |
| 3,612,858 | 10/1971 | Parry | 324/71.3 |
| 3,749,963 | 7/1973 | Frederickson et al. | 328/228 |
| 3,784,909 | 1/1974 | Schutt et al. | 250/397 |
| 4,284,952 | 8/1981 | Fink | 324/71.3 |
| 4,434,399 | 2/1984 | Mourou et al. | 250/397 |

OTHER PUBLICATIONS

"Position and Intensity Monitoring System for Spear Transport System of SLAC" by A. K. Chang et al. SLAC-Pub-1218, Mar. 1973, Stanford Linear Accelerator Center, Stanford University, Stanford, Calif.

"A Review of Accelerator Instrumentation" by Pellegrin, SLAC-Pub-2522, Stanford Linear Accelerator Center, Stanford University, Stanford, Calif., May 1980.

Primary Examiner—Saxfield Chatmon
Attorney, Agent, or Firm—Clifton E. Clouse, Jr.; Roger S. Gaither; Judson R. Hightower

[57] ABSTRACT

A combined gap and stripline monitor device (10) for measuring the intensity and position of a charged particle beam bunch in a beam pipe of a synchotron radiation facility. The monitor has first and second beam pipe portions (11a, 11b) with an axial gap (12) therebetween. An outer pipe (14) cooperates with the first beam pipe portion (11a) to form a gap enclosure, while inner strips (23a–d) cooperate with the first beam pipe portion (11a) to form a stripline monitor, with the stripline length being the same as the gap enclosure length.

9 Claims, 4 Drawing Figures

GAP AND STRIPLINE COMBINED MONITOR

The United States Government has rights in this invention pursuant to Contract No. DE-AC-03-82-ERI3000 between the U.S. Department of Energy and Stanford University.

BACKGROUND OF THE INVENTION

The present invention relates generally to electrical instrumentation and more particularly to the monitoring of the intensity and position of electrically charged beam bunches within transport systems.

The present invention was devised in response to the need for monitoring the intensity and position of beam bunches of charged particles in a synchrotron radiation facility having a linear accelerator, a storage ring, and an interconnecting transport line. In the particular facility involved, an electron gun having a very short (0.7 ns) rise time is used to provide two modes of operation. In one mode, beam bunches of 4 ns are produced for injection purposes, while in the other mode, much longer beam bunches (in the order of 2 $\mu$s) are produced for nuclear physics experiments.

Critically aligned experiments can be very sensitive to very small changes in the trajectory of the beam. In some cases, a 50 micron shift, or less, of the beam's intensity maximum at a narrow entrance slit can cause a significant loss in intensity and an increase of beam noise, particularly at high photon energies. These stringent alignment tolerances necessitate a steering control system capable of making and maintaining fine corrections to the position of the beam bunches within the lines of the synchrotron system.

A fundamental component of such a steering system is the instrumentalism used to sense the intensity and position of the beam bunches within the synchrotron line during the different modes of operation. The accuracy and stability of steering adjustments are intrinsically limited by the performance characteristics of the monitors. With the tighter alignment tolerances of present systems, a relatively large number of beam monitors is needed.

What is desired is the monitoring instrumentation is a monitor device which can be used at a desired location in the beam path to provide high resolution measurements of the intensity of the beam and its position relative to the axis of the transport line, for both modes of operation, and with output signals which are of similar shape so that they can be handled by a single signal processing system.

Prior to the present invention, no simple, single monitor device existed which fulfilled this need.

Gap monitors have been used to measure the total intensity of beam bunches. Basically, these moniors consists of a circumferential gap in the beam pipe through which the beam bunches are passing, with a voltage being developed across the gap as the beam bunches pass thereby. In some instances, the gap is filled with a ceramic material to insulate between the ends of the beam pipe and maintain the vacuum within the beam pipe, with the output signal being developed across a resistor connected between the ends of the beam pipe. In other gap monitors a coaxial structure is provided to serve as a pressure tight gap enclosure. In such case, it is customary to stack ferrites around the beam pipe and in the gap enclosure. For beam bunches of a length much longer then the gap the ferrites serve to load the gap inductively and thereby improve the low frequency response. For narrow bunches, wherein the bunch length is comparable to the gap, the ferrites serve an entirely different purpose and absorb the reflections in the gap enclosure. The beam pipe is circumferentially electrically continuous at each side of the gap and thus the gap signal, which is proportional to the total intensity of the beam, does not provide information as to the location of the beam relative to the axis of the beam pipe.

Stripline monitors have been developed to provide output signals which will enable the position of the beam bunches relative to the beam pipe axis to be determined. Typically a stripline monitor consists of four conducting strips extending lengthwise of a section of beam pipe, the strips being symmetrically located relative to the beam pipe axis and spaced inwardly of the inner beam pipe wall. The physical relationship of the width of the strips, the diameter of the beam pipe and the spacing from the strips to the beam pipe wall will determine the characteristic impedance of the strips. The strips are connected at one end to the beam pipe, either by shorting them to the beam pipe or by terminating each strip through a resistance equal to the characteristic impedance, with the other ends of the strips being used as outputs.

In general, as a beam bunch passes through the beam pipe, output signals will be induced in each of the four striplines. The magnitude of the signal in each strip is proportional to the beam intensity, or current, and inversely proportional to the distance between the beam path and the strip. The sum and difference in signals from opposite strips can thus be used to measure the location of the beam relative to the axis of the beam pipe.

The signals from the form striplines can also be summed to provide a measurement of total beam intensity. However, in order to provide for proper impedance of the striplines and good sensitivity for position measurement, the strips should be relatively narrow. As a consequence, they can only pick up a small part of the wall current signal induced by the beam, with a consequent sacrifice in precision of a total intensity measurement.

SUMMARY OF THE INVENTION

It is an object of the invention to provide a single monitor device for use with beam bunches of electrically charged particles passing through a beam pipe which is capable of providing output signals enabling a high resolution monitoring of the total intensity and the location of the bunches in the beam pipes.

It is a further object of the invention to provide a single monitor device which can be used with, and provide similar output signals for, beam bunches of greatly different lengths.

Another object of the invention is to provide a single monitor which will provide simultaneous measurements of beam position and intensity without interference between the two measurements.

Still another object is to provide a device for monitoring both beam position and intensity which is relatively inexpensive and of minimum physical length.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the present invention, as embodied and broadly described herein, a beam bunch monitor device is provided, such monitor device having a beam pipe with first and second aligned portions separated by a gap, an outer coaxial pipe connected to the first beam pipe portion away from the gap and to the second beam pipe portion adjacent the gap to form a gap enclosure, and a plurality of strip lines within the first beam pipe portion extending lengthwise thereof from adjacent the gap.

BRIEF DESCRIPTION OF THE DRAWINGS

The accompanying drawings, which are incorporated in and form a part of the invention and, together with the description, serve to explain the principles of the invention.

DETAILED DESCRIPTION OF THE INVENTION

Figure 1:
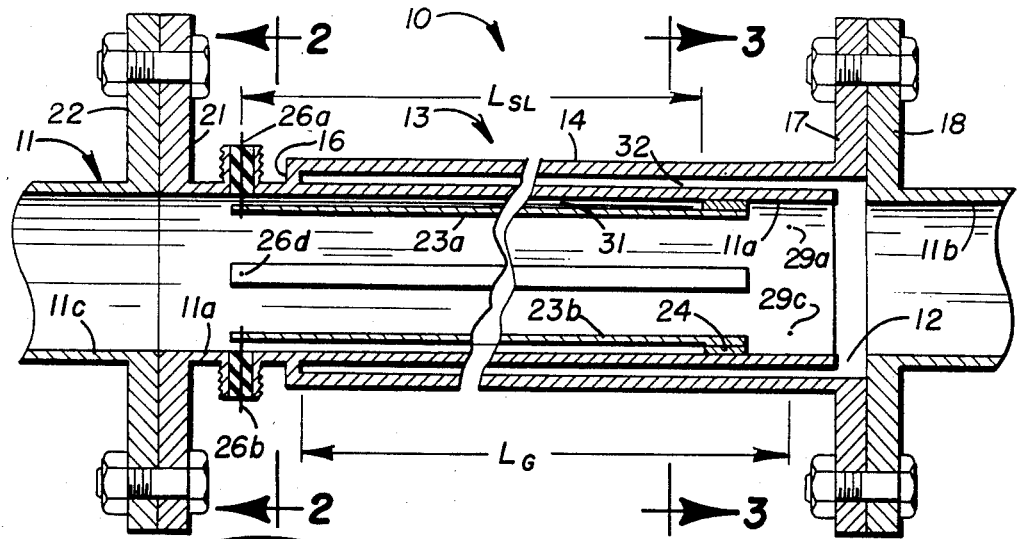
FIG. 1 is sectional lengthwise view of a beam bunch monitor device made in accordance with the invention.
Figure 2:
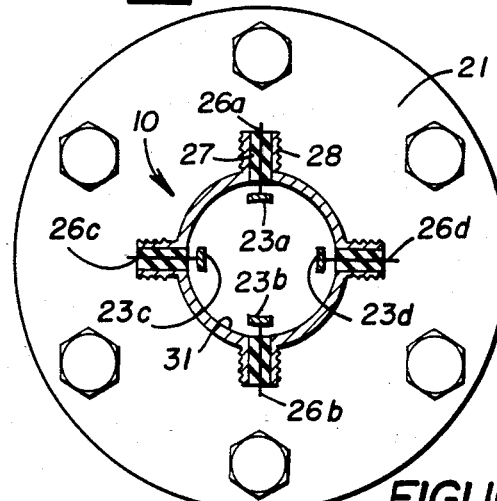
FIGS. 2 and 3 are transverse sectional views of the monitor device of FIG. 11, taken on the lines 2—2 and 3—3 thereof, respectively.
Figure 3:
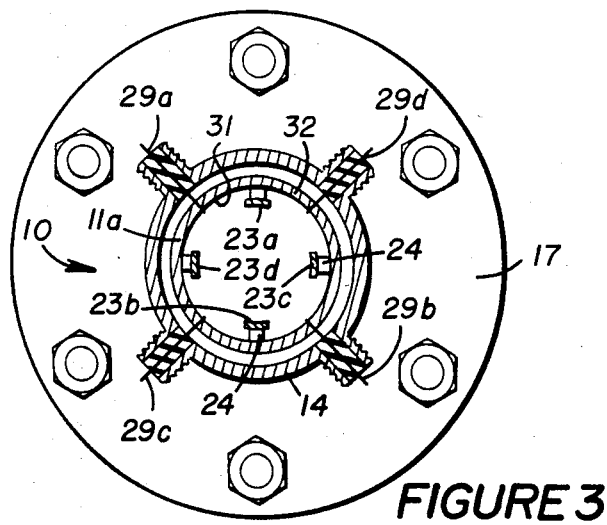

Referring now to the drawings, which illustrate a preferred embodiment of the invention, the monitor device 10 of the present invention is designed to be inserted into, and form part of an electrically-conductive beam pipe 11 through which beam bunches of charged particles pass. The beam pipe 11 is preferably made of steel. With the monitor 10 in place, the beam pipe will have first and second aligned and coaxial portion 11a and 11b which are separated by an axial gap 12.

A gap enclosure 13 is formed by an outer, electrically-conductive pipe 14 co-axial with, and spaced outwardly from, the first beam pipe portion 11a. The outer pipe 14 is connected to the beam pipe portion 11a by an annular end wall 16 which is spaced away from gap 12. The end wall 16 functions to electrically short the outer pipe 14 to the beam pipe portion 11a and to physically maintain the vacuum within the beam pipe 11. The outer pipe 14 is also electrically and mechanically connected to beam pipe portion 11b adjacent gap 12 by the radially extending flanges 17 and 18.

The beam pipe portion 11a of the monitor device 10 is connected to beam pipe portion 11a by means of radial flanges 21 and 22. The beam pipe portions 11a, 11b and 11c are all coaxial and have the same inner diameters.

The stripline portion of the monitor device 10 includes four electrically-conductive strips 23a, 23b, 23c and 23d which extend lengthwise of the first beam pipe portion 11a and parallel to the beam pipe axis, the strips being spaced inwardly from the inner surface of the beam pipe portion 11a and being arranged symmetrically around the interior of the beam pipe. The strips are preferably made of steel or copper. Each strip 23a–d is connected at one end thereof to the first beam pipe portion 11a closely adjacent to gap 12 by a spacer block 24 which functions electrically to short the strip to the beam pipe and mechanically to support the strip at a desired distance from the inner wall of the beam pipe.

The other end of strip 23a has a conductive terminal lead 26a connected thereto and extending out through insulator 27. The tubular port surrounding insulator 27 is threaded at 28 so that a coaxial cable (not shown) may be connected to the beam pipe portion 11a and terminal 23a. In like manner, strips 23b–d have terminals 26b–d extending outwardly of the monitor device 10.

Also in like manner, external gap signal terminals 29a–d are connected to the first beam pipe portion 11a at circumferentially spaced locations adjacent to gap 12.

Figure 4:
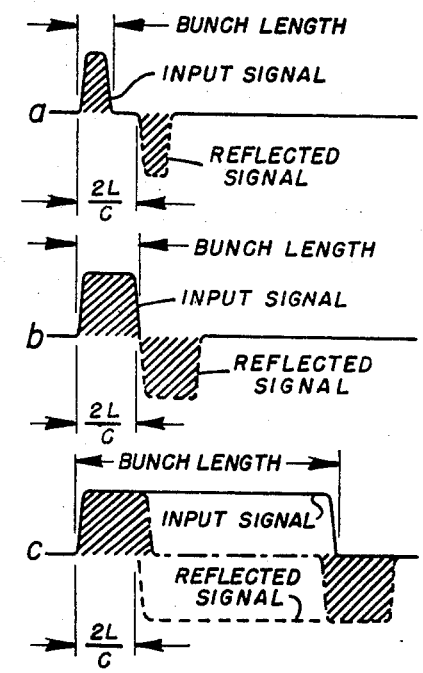
FIGS. 4(a), (b) and (c) and 5 illustrate the input and output pulses in the monitor device of FIGS. 1-3 for beam bunches of different lengths.

FIG. 4(a) illustrates the operation of the gap portion of the monitor device 10 when a beam bunch has a time length less than $2L/c$, "L" being the length $L_G$, in centimeters, of the gap enclosure formed by the first beam pipe portion 11a and outer pipe 14, and "c" being the speed of light, i.e. $3 \times 10^{10}$ centimeters per second. As the beam bunch passes gap 12, the charged particles will induce an input signal between the first and second beam pipe portions and a substantially instantaneous output signal (the shaded portion above the baseline) at terminals 29a–d which corresponds in shape and magnitude to the input signal. The input signal travels the length of the gap enclosure 13 and is reflected back towards the gap. The reflected signal, shown in dotted line in FIG. 4(a), causes an output signal (the shaded portion below the baseline) to appear at the output terminals 29a–d. Thus, a beam bunch passing the gap 12 will generate a bipolar signal with two pulses of opposite polarity. With the beam bunch having a duration less then $2L/c$, the two pulses will be spaced apart by that length of time, i.e. $2L/c$. In addition, the width of either the positive or the negative pulse will be equal to the length of the beam bunch.

FIG. 4(b) illustrates the operation with a beam bunch having a length equal to $2L/c$. In this case, a bipolar signal will again be generated at the output terminals, with the opposite polarity pulses again being separated by $2L/c$ and with the width of either the positive or the negative pulse being equal to the bunch length.

FIG. 4(c) illustrates the operation of the gap portion when the beam bunch has a length longer than $2L_G/c$. In this case, a beam bunch passing gap 12 will induce an input signal (shown in solid line) at the gap entrance. The input signal will travel the length of the gap enclosure and be reflected back so that a reflected signal (shown in dotted line) will be at the output terminals. The output signals will be the overlay of the induced signal at the gap and the reflected signal from the end of the coaxial structure, and will be the bipolar signal shown in shaded lines in FIG. 4(c), with two pulses of opposite polarity, and with the spacing between the two pulses being equal to the bunch length.

As may be seen from FIGS. 4(a), (b), (c) if the gap length $L_G$ is made so that $2L/c$ is equal to the length beam bunch in the shortest beam bunch mode of operation, then the positive (or the negative) output pulses will be substantially the same in shape regardless of the bunch length.

The beam intensity, or current, and be determined by $I = Vq/R$, wherein Vq is the peak voltage of the pulse output of this gap monitor, and R is the characteristic impedance of the coaxial structure. This gives an absolute current measurement. To avoid any sensitivity to beam position, the output signal is taken from the four output terminals, or ports, 29a–d, symmetrically placed around the gap. Suitable circuitry can then be used to integrate the four output signals.

The stripline portion of the monitor device 10 is based on the principle of a traveling wave electrode. As a beam bunch moves to the right in FIG. 1 and passes the left, or front, ends of the strips 23a-d, it induces signals $V_1$, in each strip, the signals $V_1$ having components which travel in both directions, one component traveling towards the output terminal ends of the strips, and the other component traveling towards the short circuit ends of the strips. A similar process happens when the beam bunch reaches the downstream end of the strips, with signals $V_2$ being induced in the strips, the $V_2$ signals being opposite in polarity to the $V_1$ signals and having components traveling in both directions. The components of the $V_1$ and $V_2$ signals which travel towards the shorted end of the strips cancel each other out while the components of these signals which travel towards the output terminal ends of the strips appear there with the component of the $V_1$ signal leading the component of the $V_2$ signal.

Just as for the gap monitor, short bunches, i.e. of a length equal to or less then twice the stripline length $L_{SL}$, will produce bipolar signals having opposite polarity pulses which are separated by 2L/c. Likewise, if the beam bunch is longer than twice the stripline length, a bipolar signal will be generated, with the two pulses thereof being separated by a time equal to the bunch length. Thus, the output signals from the stripline monitor will have shapes essentially as shown in FIGS. 4(a), (b) and (c).

The pulse amplitude in each of the strips 23a-d will be proportional to the beam intensity and inversely proportional to the distance from the beam path to the particular strip. By utilizing the sum and difference of the signals from the two pairs of opposed strips, the position of the beam relative to the axis of the beam pipe portion 11a can then be determined by known methods.

As is apparent from the foregoing, with the length $L_{SL}$ of the stripline portion and the gap enclosure length $L_G$ being equal to each other, the length $L_{SL}$ and $L_G$ will then be a common factor for the position and intensity measurements. Accordingly, the shapes of the output signals will be the same for the position signals at output terminals 26a-d and for the intensity signals at output terminals 29a-d. Although the first beam pipe portion 11a of the monitor device 10 cooperates with both the strips 23a-d and the outer pipe 14, the inner surface 31 of the beam pipe portion 11a is used as part of the transmission line of the stripline portion of the monitor while the outer suface 32 of the beam pipe portion 11a is used as one of the two surfaces of the gap portion of the monitor. As a consequence, simultaneous measurements of beam position and intensity are possible without interference between the two measurements. Accomplishing both measurements with a single monitor device saves space, and the similar output signals, from both parts of the monitor device and for differing bunch length greatly simplifies the electronics of the equipment used to process the monitor signals.

The foregoing description of a preferred embodiment has been presented for purposes of illustration and description. It is not intended to be exhaustive or to limit the invention to precise form described, and obviously many modifications and variations are possible in light of the above teaching. The embodiment was chosen in order to best explain the principles of the invention and its practical application to thereby enable others in the art to best utilize the invention in various embodiments and with various modifications as are suited to the particular use contemplated. Although the above description is directed to a monitor device for use with a synchrotron radiation facility, the monitor device described herein can be used for other applicatons wherein a non-intercepting measurement of intensity and position of charged particle beams is desired.

I claim:

1. A monitor device comprising:
   an electrically-conductive beam pipe having first and second aligned coaxial portions separated by an axial gap,
   an outer electrically-conductive pipe coaxial with said beam pipe,
   means for electrically connecting said outer pipe to said first portion of said beam pipe at a location spaced from said gap and to said second portion of said beam pipe at said gap,
   a plurality of elongated electrically-conductive strips within said first portion of said beam pipe and parallel to the axis thereof, said strips being spaced inwardly from said beam pipe and being spaced from each other,
   means for electrically connecting one end of each of said striplines to said first portion of said beam pipe at a location closely adjacent to said gap,
   a first output terminal means connected to said first portion of said beam pipe adjacent said gap,
   a second output terminal means having terminals connected individually to each of said strips at the ends thereof away from said gap.

2. A monitor device as set forth in claim 1 wherein the length of each of said strips is substantially equal to the length of said outer pipe from said gap to the electrical connection of said outer pipe to said first portion of said beam pipe.

3. A monitor device as set forth in claim 1, wherein there are four of said strips symmetrically arranged within said first portion of said beam pipe.

4. A monitor device as set forth in claim 3 wherein the length of each of said strips is substantially equal to the length of said outer pipe from said gap to the electrical connection of said outer pipe to said first portion of said beam pipe.

5. A monitor device as set forth in claim 1, wherein said first output terminal means comprises a plurality of terminals individually and symmetrically connected to said first portion of said beam pipe adjacent said gap.

6. A monitor device as set forth in claim 1 wherein said first output terminal means comprises four terminals individually and symmetrically connected to said first portion of said beam pipe adjacent said gap.

7. A monitor device as set forth in claim 6 wherein the length of each of said strips is substantially equal to the length of said outer pipe from said gap to the electrical connection of said outer pipe to said first portion of said beam pipe.

8. A monitor device as set forth in claim 1, wherein there are four of said strips symmetrically arranged within said first portion of said beam pipe, and wherein said first output terminal means comprises four terminals individually and symmetrically connected to said first portion of said beam pipe adjacent said gap.

9. A monitor device as set forth in claim 8 wherein the length of each of said strips is substantially equal to the length of said outer pipe from said gap to the electrical connection of said outer pipe to said first portion of said beam pipe.

* * * * *